United States Patent [19]
Hoglund

[11] 3,752,037
[45] Aug. 14, 1973

[54] CAM CONTROLLED CUTTING APPARATUS

[75] Inventor: Nils O. Hoglund, Short Hills, N.J.

[73] Assignee: Tri-Ordinate Corporation, Berkeley Heights, N.J.

[22] Filed: Nov. 24, 1971

[21] Appl. No.: 201,776

[52] U.S. Cl.............................. 90/24.3, 82/19, 90/30, 90/31
[51] Int. Cl............................. B23d 1/30, B23d 5/04
[58] Field of Search.................... 90/24.3, 30, 31; 82/1.2, 1.3, 1.4, 1.5, 19

[56] References Cited
UNITED STATES PATENTS

| | | | |
|---|---|---|---|
| 342,357 | 5/1886 | Helbling | 90/24.3 |
| 826,755 | 7/1906 | Waldron | 82/1.3 |

Primary Examiner—Francis S. Husar
Attorney—Dean S. Edmonds, Harry C. Jones et al.

[57] ABSTRACT

A cutting apparatus for cutting the surface of a workpiece along intersecting paths and including a cam-cam follower mechanism, cutting means mounted on the follower part of the mechanism, driving means for moving the cam and follower relative to each other to move the cutting means successively along said paths, and control means associated with the cam-cam follower mechanism for turning the follower on the cam to move the cutting means from one path to the other while holding the cutting means at the intersection of the two paths.

25 Claims, 26 Drawing Figures

Patented Aug. 14, 1973

INVENTOR
Nils O. Hoglund
BY Pennie, Edmonds,
Morton, Taylor & Adams
ATTORNEYS

Patented Aug. 14, 1973
3,752,037
13 Sheets-Sheet 2
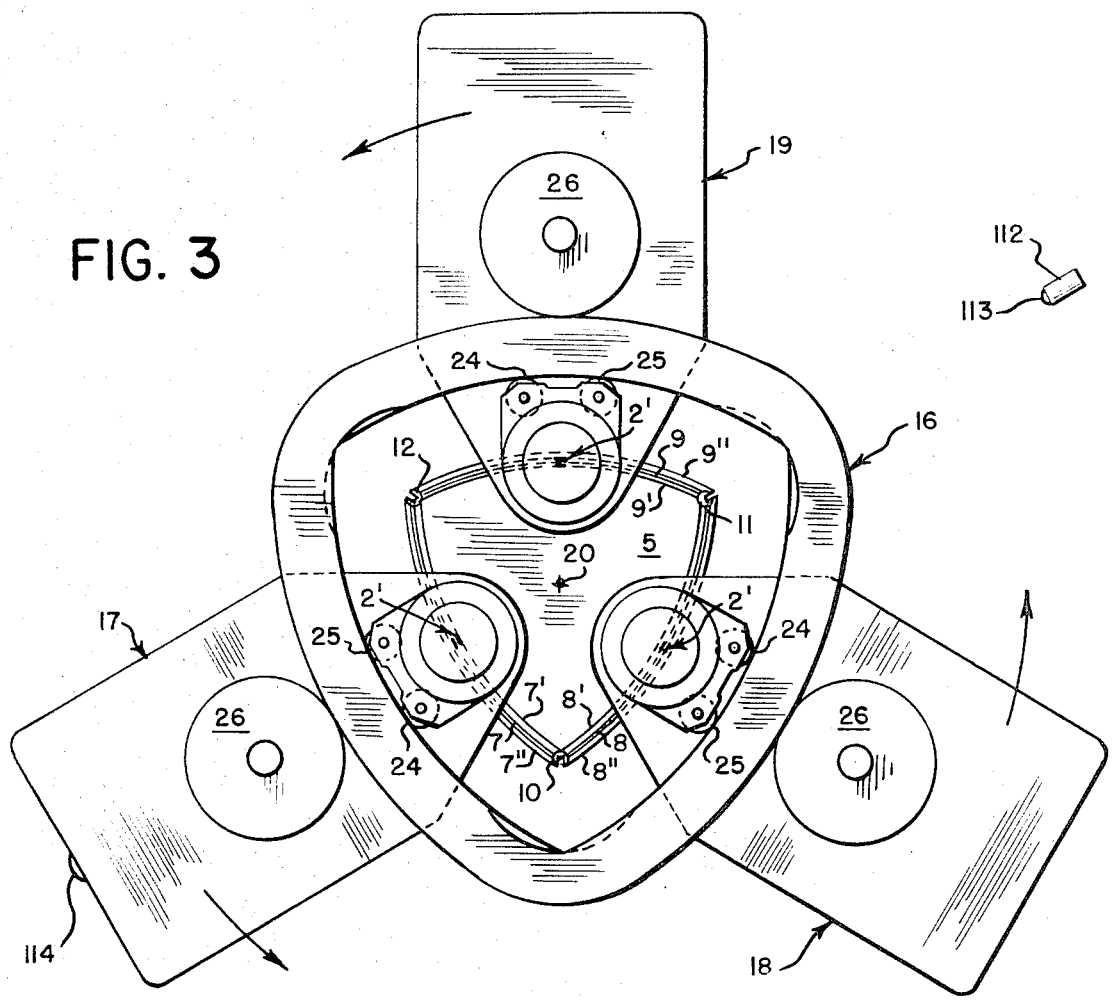
FIG. 3
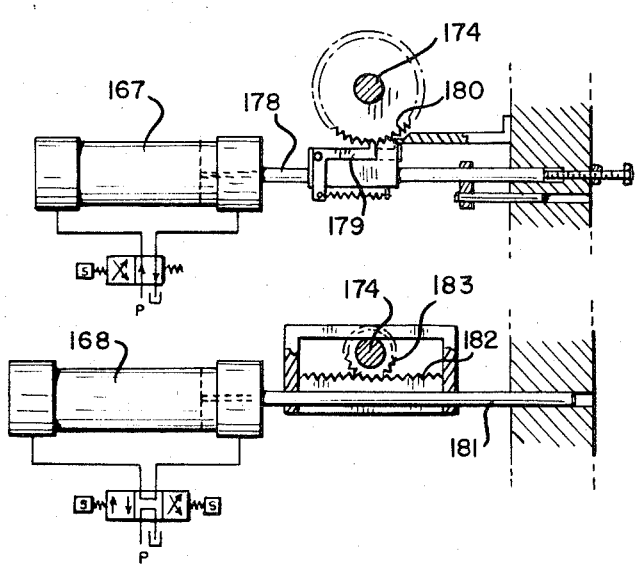
FIG. 25
FIG. 26
INVENTOR
Nils O. Hoglund
BY
ATTORNEYS INVENTOR
Nils O. Hoglund
ATTORNEYS INVENTOR
Nils O. Hoglund

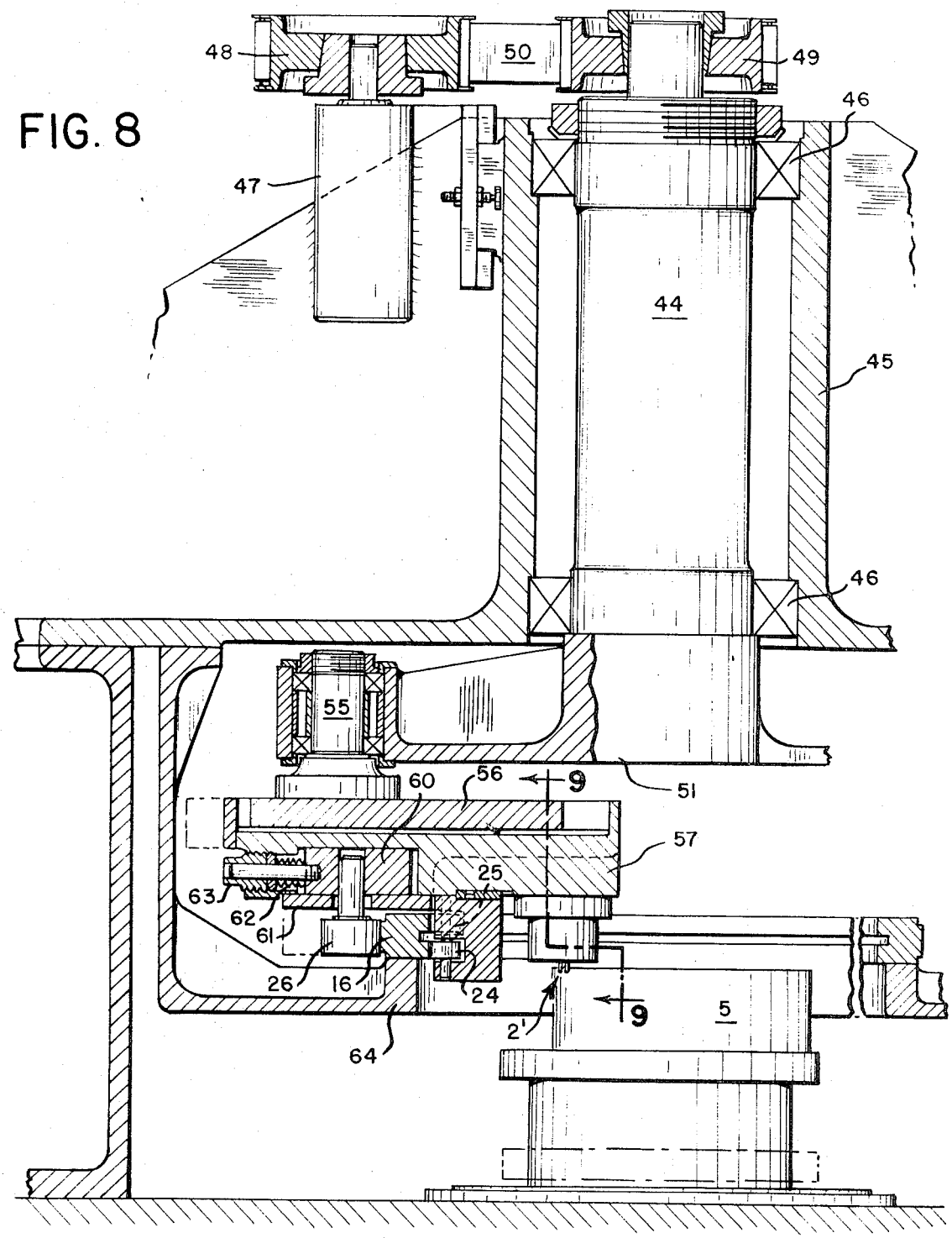

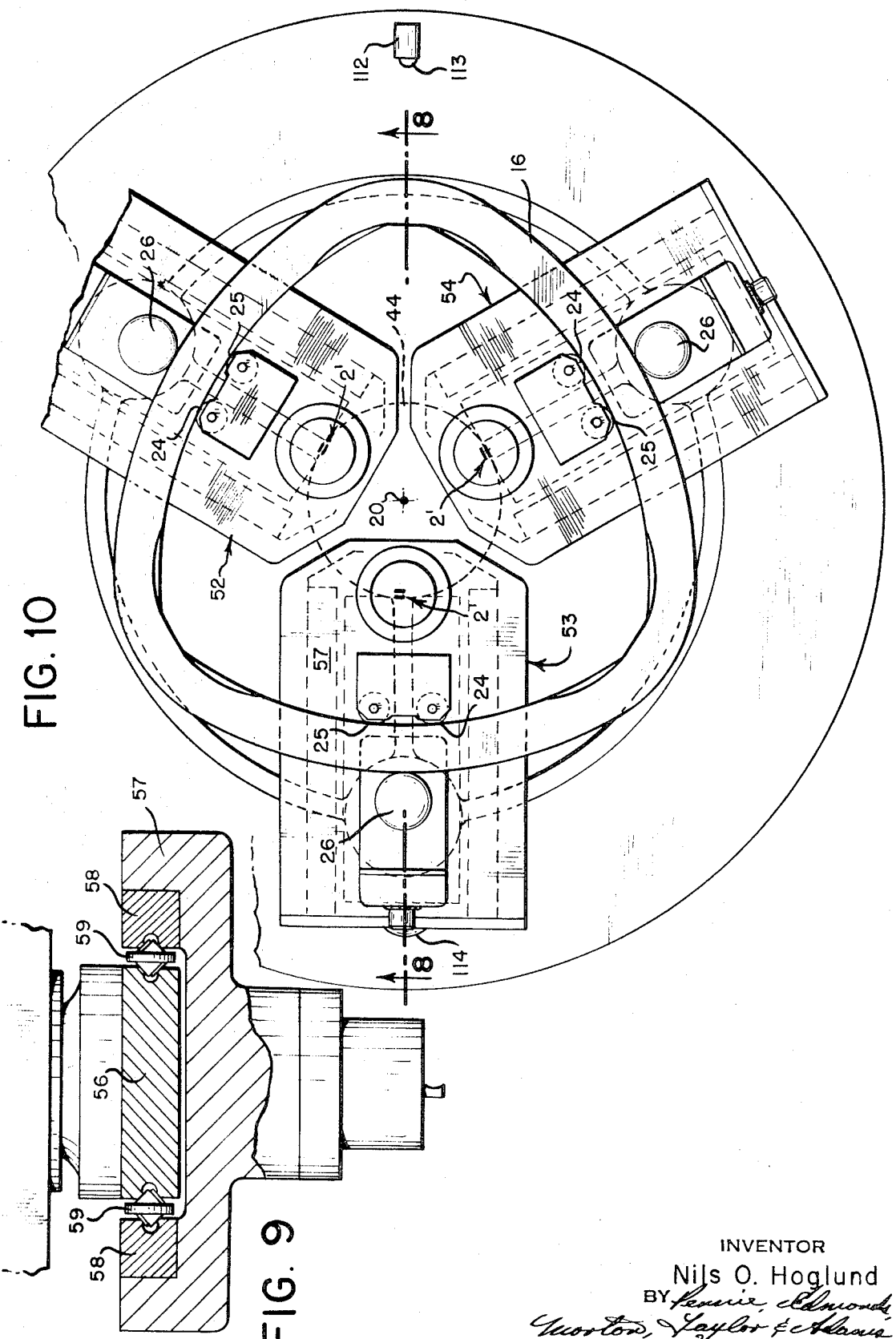

Patented Aug. 14, 1973  3,752,037

INVENTOR
Nils O. Hoglund
BY
ATTORNEYS

Patented Aug. 14, 1973

INVENTOR
Nils O. Hoglund
BY
ATTORNEYS

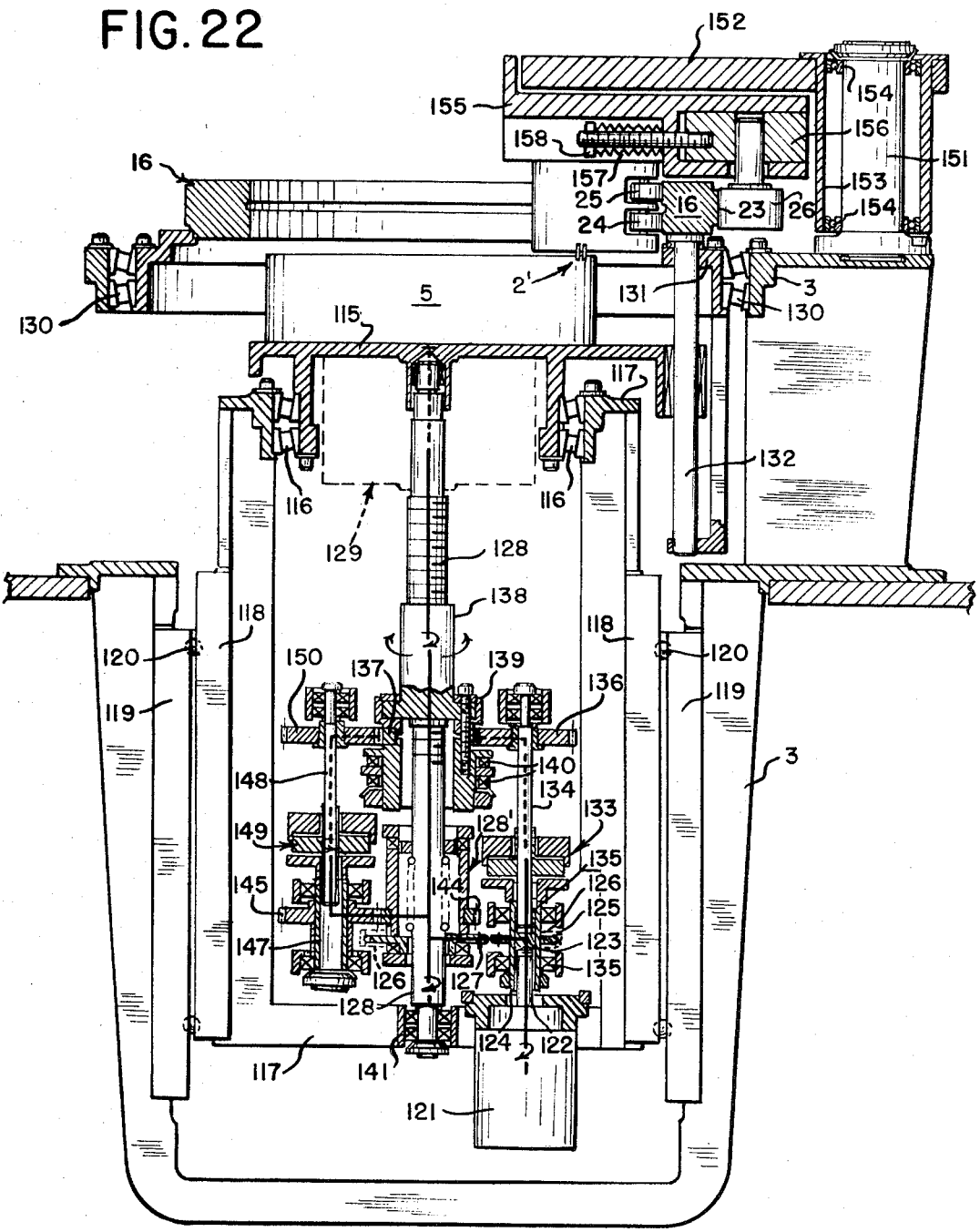

CAM CONTROLLED CUTTING APPARATUS

BACKGROUND OF THE INVENTION

Recently, the Wankel engine has become of great interest as a possible substitute for the conventional reciprocating piston engine. This has been brought about mainly by the public concern over pollution of the atmosphere as caused by the piston engine.

In construction, the Wankel engine includes a stator housing having a rotor rotating within a bore formed in the housing. The shape of the housing bore is epitrochoidal and the rotor is mounted eccentrically on a shaft rotating centrally within the bore. In shape, the rotor is generally triangular with the sides having a slight convex curvature. In order to provide for the induction, compression, ignition and exhaust of the gas fuel as the rotor rotates within the bore, it is necessary that the rotor be provided with seals cooperating with the stator to form separate chambers. Sealing is necessary at the three apexes of the rotor where contact with the wall surface of the bore is made and along the opposite side faces of the rotor for sealing the rotor against the end walls of the housing bore.

The seals on the side faces of the rotor as well as those at the apexes must be precisely oriented so as to maintain a proper sealing with the stator. With present constructions, the seals are attached to the rotor by seating within seal grooves formed in the rotor. With respect to the grooves in the sides of the rotor, they extend in arcuate paths adjacent the three edges of the rotor, a pair of grooves being provided adjacent each edge for a total of six grooves on each side of the rotor.

In order to properly hold the seals within the grooves they must be accurately formed to a uniform depth and width throughout their length. If this is not done, the seals will tend to fall out of the grooves or make uneven contact with the end walls of the stator housing. The formation of the grooves in the sides of the rotor is further complicated by the fact that these grooves must intersect each other at the apexes of the rotor without extending to the edge of the rotor. This characteristic of the grooves makes it necessary that the cutting of any one groove must be stopped before it reaches an apex of the rotor and the cutting means moved out of this groove and into alignment for cutting the adjacent groove running to the next apex of the rotor.

The cutting of the grooves in the rotor could be made more efficient if they could extend to the edges of the rotor and it was not required that they turn within the small zones adjacent the apexes. With the closed path formed by the seal grooves, however, the cutting operation of presently available equipment has been rather time consuming. Also, the accuracy required in cutting the grooves as well as their shape and orientation on the rotor has made present cutting equipment for performing this operation inefficient.

With one type of cutting apparatus presently available, the grooves in the side faces of the rotor are cut by a milling operation. A circular milling cutter is used for cutting each groove to its final depth and shape in one stroke. In order to do this, however, the milling cutter must be moved very slowly through the workpiece; and with a total of three pairs of grooves on each side of the rotor it takes twelve strokes to complete the cutting operation on both sides of the rotor.

Instead of cutting the grooves to their final configuration in one stroke, attempts have been made to cut the grooves in a series of successive cuts, each a little deeper than the next. With equipment of this nature, a single cutting tool is used and fed through multiple strokes along each of the paths where the grooves are to be formed. At the end of each cutting stroke the cutting tool is raised out of the workpiece, returned to its starting position and then lowered back onto the workpiece a few thousandths of an inch deeper than with the last cutting stroke. It is apparent that with the return stroke performing no cutting operation, the time required to cut the grooves in the rotor is rather long.

SUMMARY OF THE INVENTION

In accordance with the teachings of the present invention, the cutting of the side grooves in the rotor is performed quickly and efficiently. In addition, the grooves are cut with a high degree of precision so as to securely hold the seals in place and effect proper sealing thereof with the end walls of the stator.

In construction, the cutting apparatus of the present invention generally includes an annular cam member which is positioned in encircling relation with the rotor. Cam follower means are associated with the cam member and hold the cutting means of the apparatus. The cam member has cam tracking surfaces which are followed by the follower means and which correspond to the three paths through which the cutting means must move along the workpiece to cut the pairs of grooves adjacent the three edges of the rotor. The cam also includes tracking surfaces which cause the cutting means to turn within the zones of intersection of the paths being cut on the workpiece so that the cutters may move from one path to the next adjacent path during continuous movement of the cam follower means about the cam and without losing any appreciable time.

In accordance with the teachings of the present invention, the cutting apparatus includes three separate cutting units mounted on three cam followers for continuous movement about the rotor workpiece with each of the cutting units performing a cutting stroke adjacent one of the edges of the rotor. With each cutting stroke of the cutting units, the grooves are cut to a fraction of the final depth desired. When the cutters reach the points of intersection of the grooves, the rotor workpiece and cutters are moved relative to each other by a small increment so that the next cutting stroke will be at a greater depth within the rotor workpiece.

Instead of providing cutters having a cutting edge shaped to the final desired groove contour, the cutting apparatus of the present invention includes a pair of differently shaped cutters in each of the three cutting units. A pair of cutters is required in each cutting unit since a pair of grooves is to be cut adjacent each edge of the rotor. The cutters of one of the cutting units are constructed for rough cutting the grooves, the cutters of the next unit are used for semi-finishing and the cutters of the third unit are used for finishing the grooves to the precise shape and dimension required for sealing the seals. The cutters of each unit are also constructed so that they assist each other in providing both an efficient and precise cutting of the grooves.

When using the cutting apparatus of the present invention, production capacity and efficiency over conventional equipment will increase manyfold; and this, in turn, will reduce manufacturing costs. As far as the quality of the finished product is concerned, applicant's invention permits the production of grooves having a

BRIEF DESCRIPTION OF THE DRAWINGS

FIG. 3 is a view showing the orientation of the workpiece relative to the cam-cam follower mechanism of the cutting apparatus of the present invention;

FIG. 8 is a cross-sectional view of a modified embodiment of the cutting apparatus shown in FIG. 5;

FIG. 9 is a cross-sectional view taken along lines 9—9 of FIG. 8;

FIG. 10 is a bottom view of the cutting apparatus shown in FIG. 8;

FIG. 22 is a cross-sectional view of the cutting apparatus shown in FIG. 21;

FIG. 25 is an enlarged view of one of the hydraulic actuator mechanisms shown in FIG. 24; and FIG. 26 is an enlarged view of another hydraulic actuator mechanism shown in FIG. 24.

DESCRIPTION OF THE PREFERRED EMBODIMENTS

Figure 1:
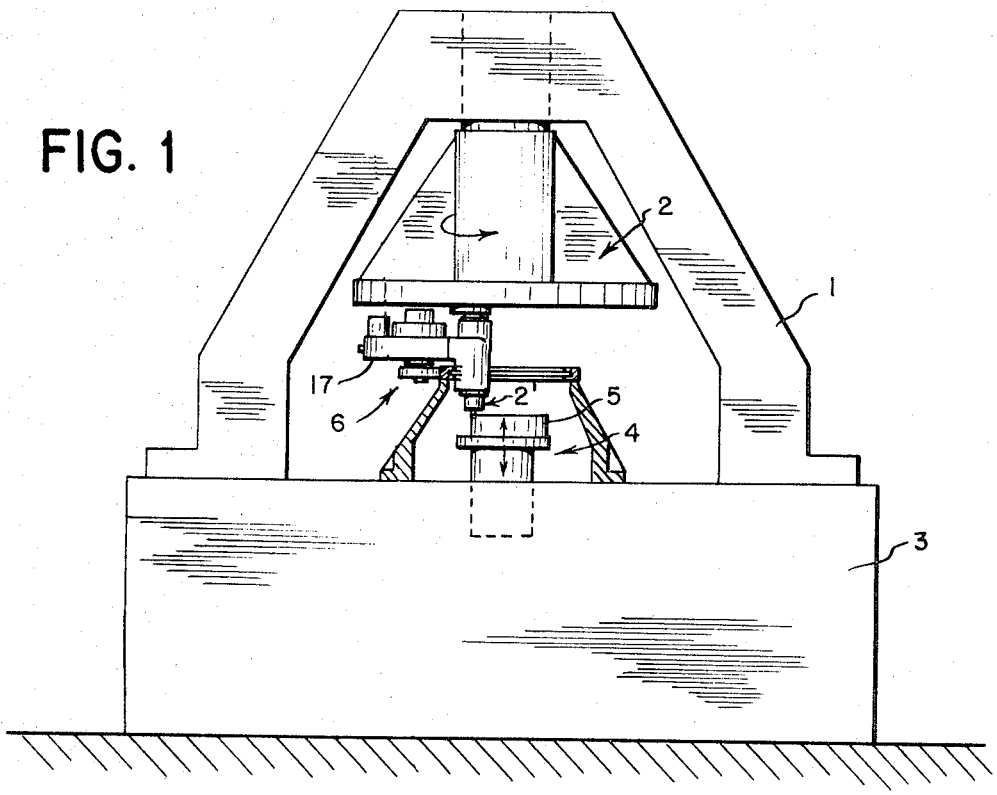
FIG. 1 is a side elevation of one embodiment of the cutting apparatus of the present invention.

As shown in FIG. 1, the cutting apparatus of the present invention generally includes a framework 1 on which the cutting means generally designated at 2 is supported. The framework is mounted on a base 3 having support means generally indicated at 4 for supporting a workpiece 5. As shown in FIG. 1, the cutting means overlies the workpiece. A cam-cam follower mechanism 6 is provided for controlling the movement of the cutting means relative to the workpiece. As more fully described below, there are three separate cutting units 2' forming the cutting means. For clarity, however, only one unit is shown in FIG. 1.

Figure 2:
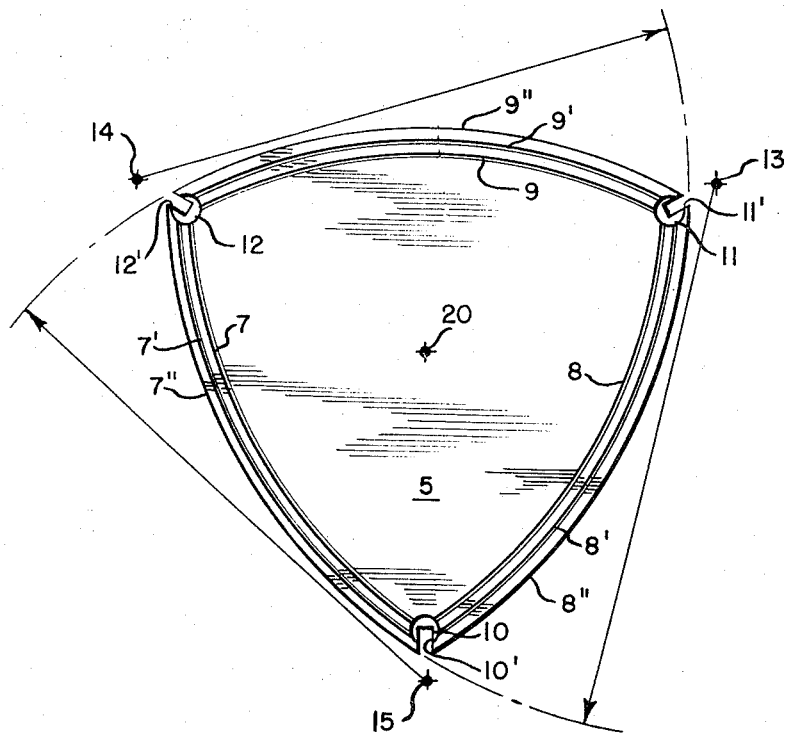
FIG. 2 is a plan view of a workpiece in which grooves have been cut by the apparatus of FIG. 1.

In FIG. 2, the workpiece is shown with the seal grooves formed therein. With the preferred embodiment of the invention, the cutting apparatus is constructed to cut the side seal grooves in the side faces of the rotor of a Wankel engine. Each side of the rotor is to include three pairs of seal grooves 7, 7', 8, 8', and 9, 9'. Each pair of seal grooves runs along a path adjacent one of the edges 7'', 8'' and 9'' of the rotor. The seal grooves 7, 8 and 9, and similarly the grooves 7, 8 and 9', intersect at their ends adjacent the apexes of the rotor in small zones of intersection designated 10, 11 and 12. In construction, these zones are cavities formed in each side face of the rotor to a depth at least equal to the depth of the seal grooves to be cut. At the apexes of the rotor, slots 10', 11' and 12' are formed for receiving the apex seals of the rotor.

As shown in FIG. 2, each of the side seal grooves follows an arcuate path related to the arcuate shape of the adjacent edge of the rotor. More particularly, the grooves 7, 7' and the edge 7'' of the rotor have a common center of curvature 13. Similarly, the grooves 8, 8'' and the rotor edge 8'' have a common center of curvature 14 while the grooves 9, 9' and the rotor edge 9'' have a common center of curvature 15.

Figure 4:
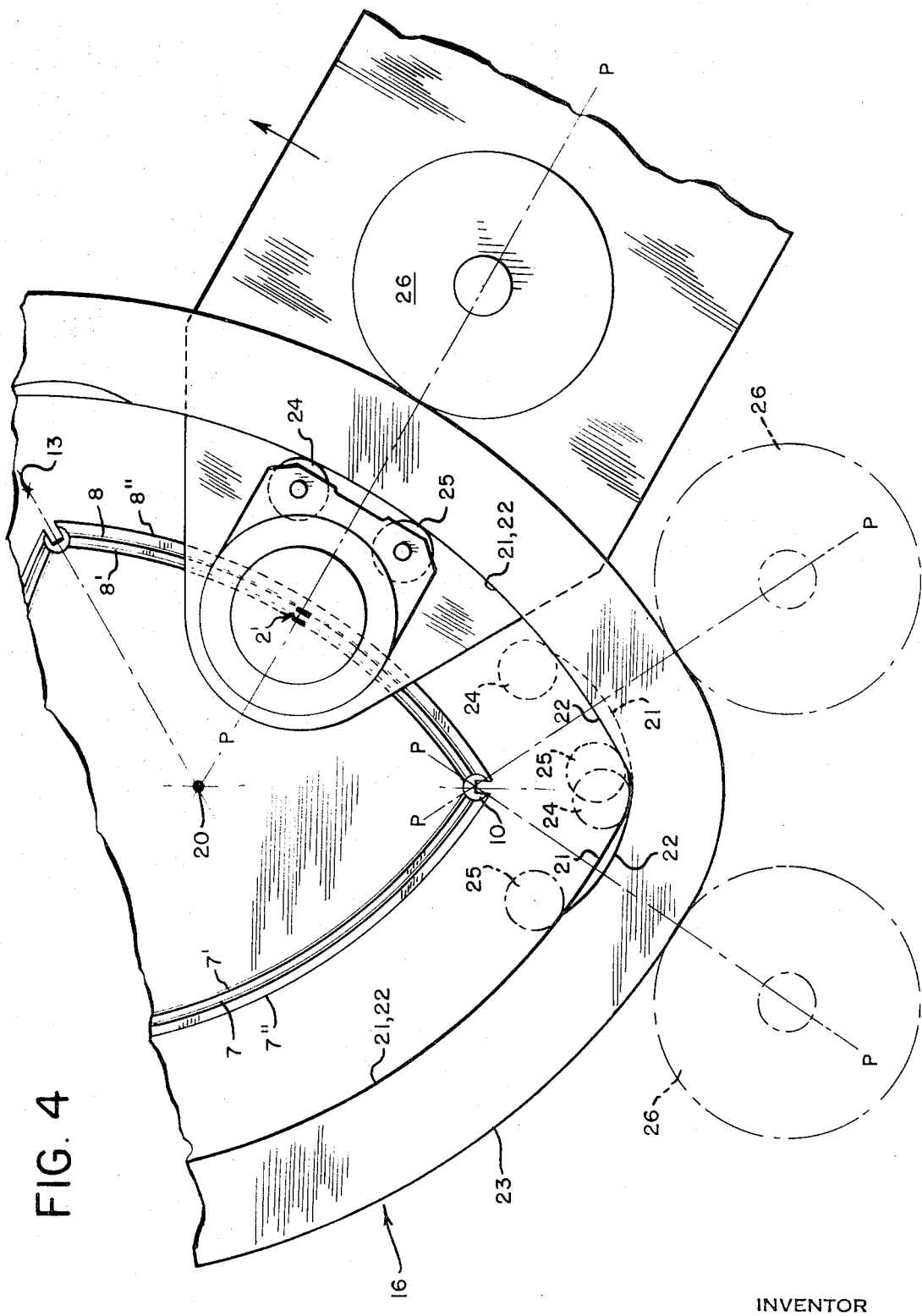
FIG. 4 is an enlarged view of a portion of the structure shown in FIG. 3.

For cutting the grooves along the arcuate paths shown in FIG. 2, the cam-cam follower mechanism 6 is employed. FIG. 3 shows the orientation of the cam-cam follower mechanism relative to the rotor workpiece 5. The cam-cam follower mechanism includes a cam member 16 and three follower units 17, 18 and 19 disposed at 120° from each other about a common point 20. One of the units 17 is shown in FIG. 1; and from FIG. 2 it will be noted that the point 20 defines the center of the segment of the workpiece bounded by the grooves. FIG. 4 is an enlarged view of the lower portion of the cam-cam follower and workpiece as shown in FIG. 3 depicting the movement of one cam follower unit 17 about an apex of the cam and the corresponding movement of one of the cutting units about one of the apexes of the rotor.

In construction, the cam member is annular in shape and provided with arcuately shaped cam tracking means in the form of two inner elongated tracking surfaces 21, 22 and a single outer elongated tracking surface 23. Each of the cam follower units includes three bearing means in the form of rollers 24, 25, and 26 engaging, respectively, against the two inner and outer tracking surfaces 21, 22, 23 of the cam member. The two inner tracking surfaces are disposed at different levels relative to their lengths. With references to FIGS. 3 and 4, the inner tracking surface 21 is disposed below the surface 22 as measured in a direction perpendicular to the plane of the paper on which these figures appear. Similarly, the rollers 24 and 25 of the follower units which ride along the inner tracking surfaces are disposed at different levels. In the construction shown in FIGS. 2 and 3, the leading roller 24 is lower than the roller 25 so that roller 24 rolls along surface 21 and roller 25 along surface 22.

The roller 26 of each of the follower units rides along the single outer tracking surface of the cam member and holds the follower units with the rollers 24 and 25 properly riding on the tracking surfaces of the cam. Advantageously, the outer roller 26 is biased into engagement with the outer tracking surface of the cam as more fully described below.

The tracking surfaces of the cam member are divided into three sections, one corresponding to each pair of curved grooves to be formed in the rotor. The sections are identical in construction since the three pairs of grooves are identical in shape. Also, the three sections of the tracking surfaces are directly related to the three pairs of grooves to be cut in the rotor. In particular, the section of the tracking surfaces 21, 22, 23 which is used for cutting the grooves 7, 7' is formed with a center of curvature 13 which is the same as that of the grooves 7, 7'. Similarly, the sections of the other tracking surfaces used for cutting the grooves 8, 8' and 9, 9' are formed with centers of curvature at 14 and 15, respectively.

The arcuate length of each of the sections of the tracking surfaces 21, 22, 23 is dependent on the construction of the follower units. With the present invention, each follower unit is constructed with a cutting unit 2' mounted radially inwardly of the cam member and in a plane P—P extending centrally between the rollers 24 and 25 and through the center of the roller 26. The construction of the follower units with the three rollers oriented in this way maintain the plane P—P at all time normal to the grooves being cut.

With the follower construction of the present invention and the follower units moving about the cam member in a counterclockwise direction, the roller 24 leads the roller 25. This, in turn, requires that the tracking surfaces 21 and 22 adjacent the apexes of the cam member be specially contoured. For example, with reference to the section of the tracking surfaces followed for cutting the grooves 7, 7', the tracking surface 21 will extend along its arcuate path (with a center of curvature at 13) past the point at which the plane P—P intersects this surface when the cutting unit is at the end of its cutting stroke in the grooves 7, 7'. The position of the roller 24 on tracking surface 21 when the cutter unit finishes this cutting stroke is shown by dashed lines in FIG. 4. Similarly, the tracking surface 22 will extend along its arcuate path (with a center of curvature 13) to a location short of the point at which the plane P—P intersects this surface when the cutting unit is located at the ends of the grooves 7, 7'. The position of the roller 25 on the tracking surface 22 at the time when the cutting unit is located at the end of this cutting stroke is shown by dashed lines in FIG. 4.

As the cam follower unit continues its counterclockwise movement about the cam from the position shown by the dashed lines of the rollers 24, 25, 26 to the position of the rollers shown in dotted lines where the plane P—P and the cutting unit are aligned with the beginning of the grooves 8, 8', it is necessary that the cutter unit remain located in the zone 10. As indicated above, this zone is a cavity formed in the workpiece and is thus void of workpiece material. Accordingly, turning of the cutters is readily effected.

To turn the follower unit about the cutter unit when located in the zone 10, the inner tracking surfaces of the cam member and undercut as shown in FIGS. 3 and 4. The centers of curvature of these undercut sections of the tracking surfaces 21 and 22 are located in the zone 10. Similarly, the section of the outer tracking surface 23 between the point at which the plane P—P extends through the ends of the grooves 7, 7'' and the point at which this plane extends through the adjacent ends of the grooves 8, 8 is formed with instantaneous centers of curvature located in the zone 10. With the preferred construction, the centers of curvature of these sections move through the zone 10 since the cutter unit will have a slight linear movement through the zone during the turning operation.

The undercut segments of the tracking surfaces 21, 22 and the corresponding segment of the tracking surface 23 define turning sections and function to turn each of the follower units about the apexes of the cam member. With this turning movement, the cutting units are moved from the end of one pair of grooves to the beginning of the next pair of grooves while held within the connecting zone of intersection. With the rotor construction having the zones of intersection formed by cavities, the turning of the cutting units may be readily effected with continuous movement of the follower units relative to the cam member. Thus, the drive for the follower units can be a continuously operating, constant speed device.

The particular size of the cam member relative to the grooves to be cut in the rotor is determined, in part, by the speed in which the follower unit is to rotate about the apexes of the rotor. The size of the cam and the relative size of the rollers is also determined by the cam geometry required for effecting proper running of the rollers on the tracking surfaces. With the cam constructions of the present invention, the size of the cam is related to the size of the rotor and the grooves to be cut so that an efficient cutting operation is obtained.

Figure 5:
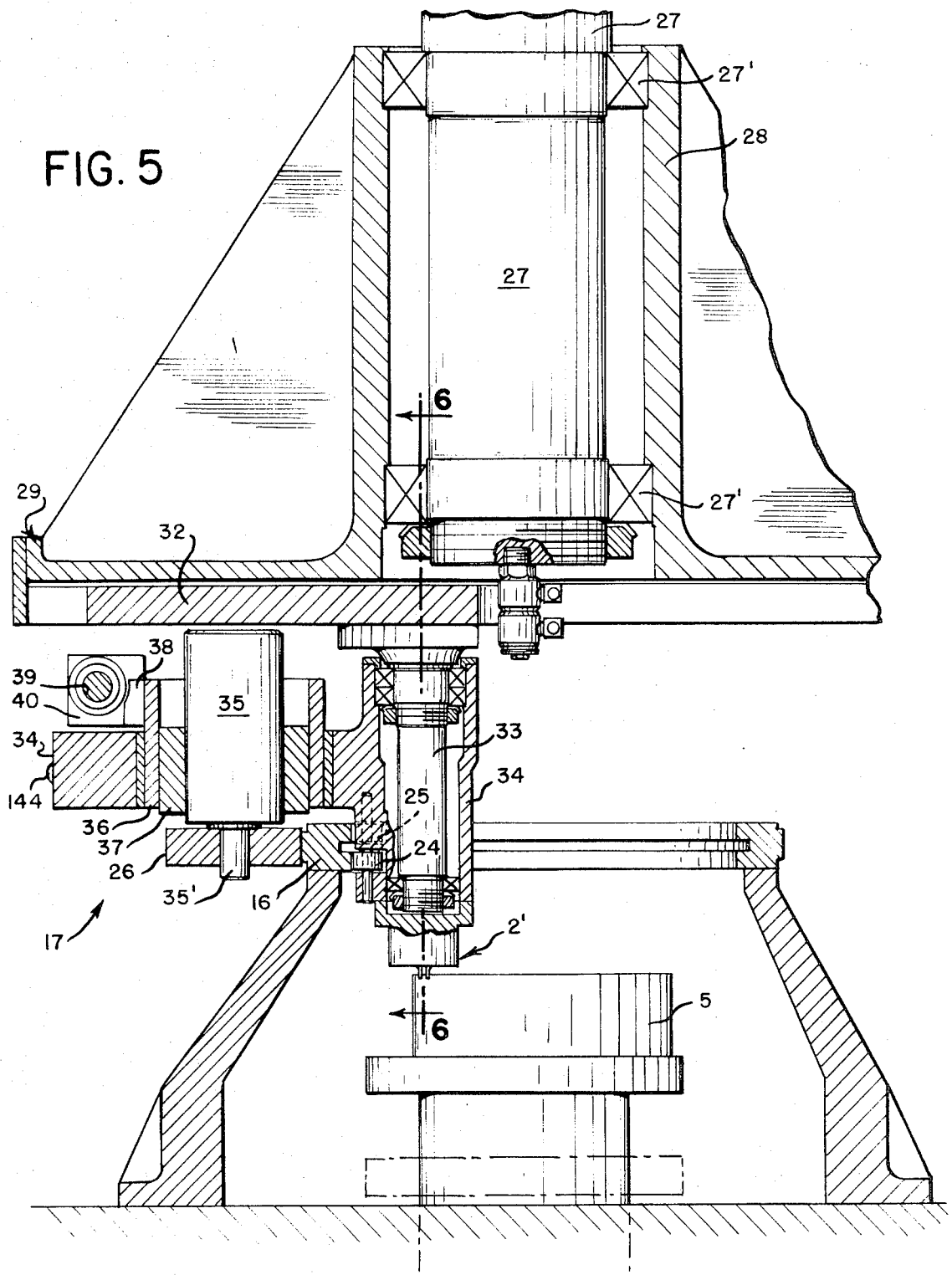
FIG. 5 is an enlarged partial cross-sectional view of the cutting apparatus shown in FIG. 1.
Figure 7:
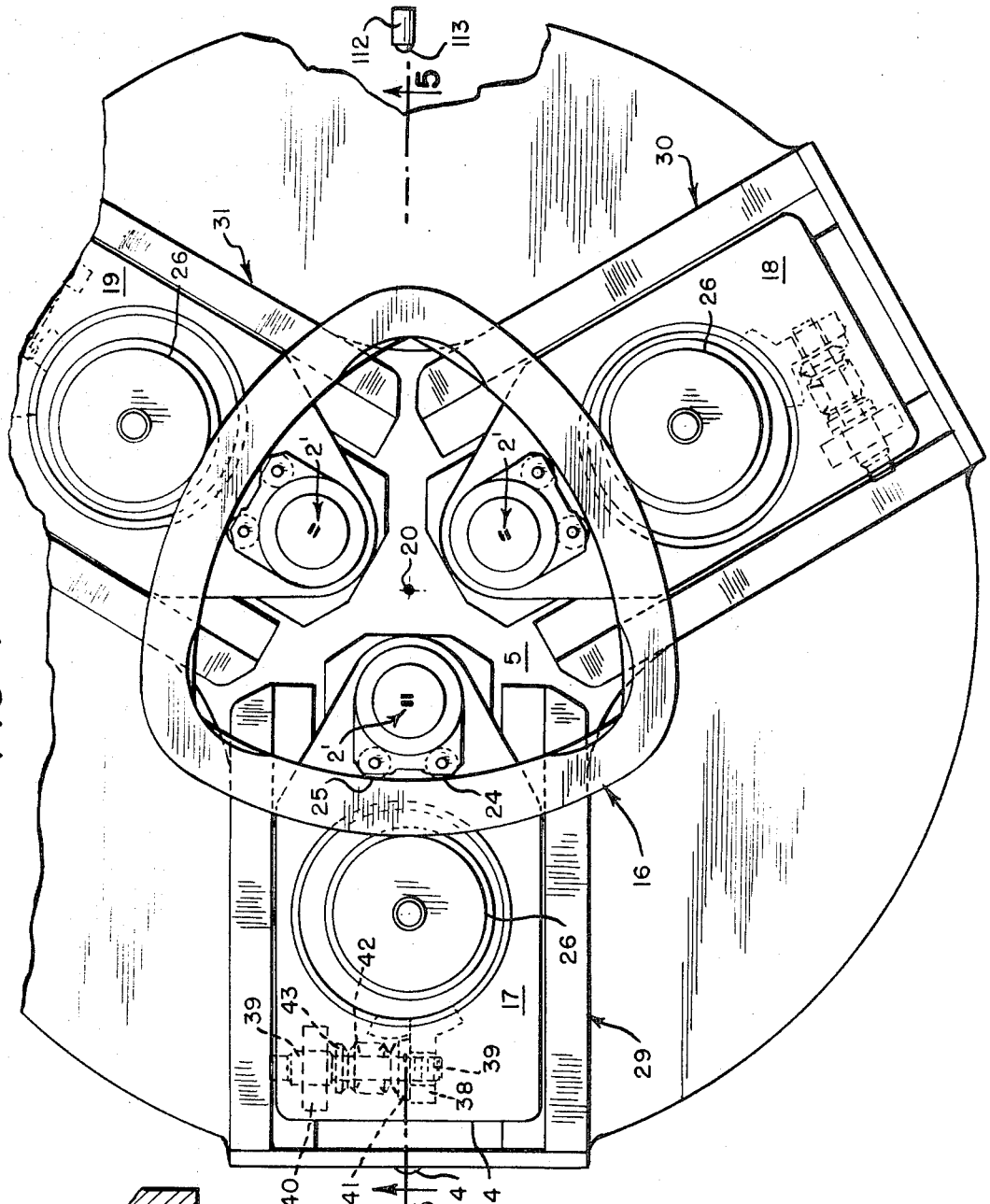
FIG. 7 is a bottom view of the cutting apparatus shown in FIG. 5.
Figure 6:
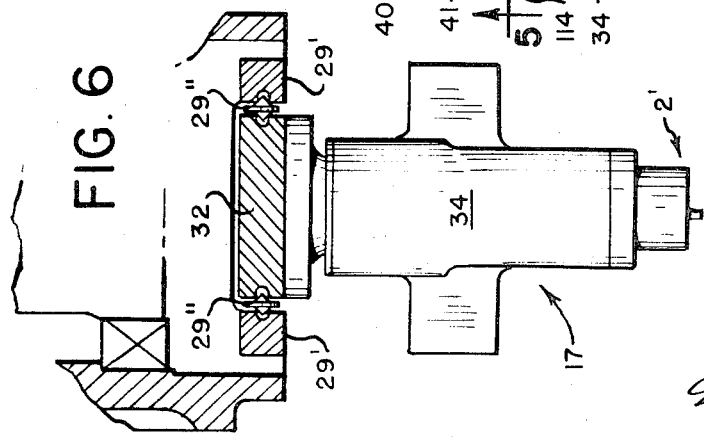
FIG. 6 is a cross-sectional view taken along lines 6—6 of FIG. 5.

FIGS. 5, 6 and 7 show one construction of applicant's cutting apparatus wherein the relative movement of the cam follower units and cam member are effected by power driving each of the follower unit rollers 26 along the outer tracking surface of the cam member. A stationary post 27 is vertically mounted with its axis at right angles to the rotor workpiece and extending through the point 20. Follower support means in the form of a housing 28 is rotatably mounted on the post 27 by way of bearings 27'. The housing has three extensions 29, 30, 31 as shown in FIG. 7 extending radially from the axis of the post 27 and spaced at 120° from each other. Each of these extensions is adapted to receive one of the follower units 17, 18 and 19.

In construction, each follower unit includes a slide 32 mounted in one of the extensions of the follower support means for radial sliding movement along the extension. As shown in FIG. 6 each extension is provided with a slide way 29' and associated bearings 29'' for slidably mounting the slide 32. A post 33 depends from the slide member 32 and rotatably supports a housing 34. The housing 34 carries the follower rollers 24 and 25 for rotation about axes extending parallel to the axes of rotation of the posts 27 and 33. Also, the housing supports a hydraulic drive motor 35 having an output shaft 35' on which the roller 26 of the follower unit is secured.

The hydraulic drive motor for the roller 26 is mounted in an eccentric 36 by way of a mounting ring 37. The eccentric is biased in a direction that urges the roller 26 against the outer tracking surface of the cam. In particular, as shown in FIG. 7, a lever 38 is attached to the eccentric and extends outwardly therefrom. The end of the lever is loosely fitted over a screw 39 which is, in turn, threadedly engaged in a bracket 40 on the housing 34. A spherical washer 41 and a series of spring washers 42 acting between a collar 43 on the screw 39 and the lever 38 urges the eccentric counterclockwise (as viewed in FIG. 7) to load the roller 26 against the outer tracking surface of the cam member.

The roller 26 of each of the roller units, by being power driven, causes the follower support means to rotate about the post 27 and point 20. By having each of the follower units slidably and rotatably mounted as described above, they may properly move in arcuate paths having centers of rotation common to those of the grooves to be cut in the rotor workpiece. Although the grooves cut in the rotor described above are formed with the centers of curvature common to the centers of curvature of the edges of the rotor, this is not necessary. For example, the grooves could be formed with a smaller curvature than that of the edges of the rotor. The cam would be shaped accordingly.

In FIGS. 8, 9 and 10 another embodiment of the cutting apparatus is shown. In this embodiment, the basic relation between the cam and cam follower means and between the workpiece and the cutting means is the same as shown in FIGS. 5, 6 and 7. That is, the workpiece and cam are held stationary while the cam follower and cutting means move about the cam. The primary difference in the constructions shown in FIGS. 8, 9 and 10 relates to the drive for the cam follower units.

A center post 44 is mounted with its longitudinal axis extending through the point 20. The post is rotatably mounted within a housing 45 by way of bearings 46. The post 44 is driven in rotation at a constant speed by a motor 47 through pulleys 48, 49 and a drive belt 50; the motor 47 being fixed to the housing 45. A three arm structure 51 is secured to the post 44 at its lower end. The structure 51 includes three extensions 52, 53, 54 spaced at 120° from each other. A shaft 55 is rotatably secured to each of the extensions and extends downwardly therefrom. Secured to each shaft 55 at its lower end is a slide guide 56 on which a housing 57 is slidably mounted. As shown in FIG. 9, roller guides 58 are attached to the housing 57 for holding rollers 59 engaging the slide guide 56.

The rollers 24 and 25 which contact the lower and upper inner tracking surfaces 21, 22 of the cam are mounted on the housing 57.

A slide 60 is held within the housing 57 by a plate 61. This slide 60 holds the follower roller 26 contacting the outer tracking surfaces of the cam 16. The slide 60 is biased toward the center of the apparatus by means of spring washers 62; and thus the roller 26 is held pressed against the cam. An adjusting screw 63 is provided for adjusting the pressure with which the roller 26 is urged against the cam. This adjusting screw is threadedly mounted in the housing 57. A cutting unit 2' is supported on each housing 57 laterally inwardly of the cam and in overlying relation with the rotor workpiece 5.

The movement of each cam follower unit about the cam is the same as with the embodiment shown in FIGS. 5, 6, and 7. The sliding, rotative mounting of the follower units permits them to adjust and move about the cam while maintaining the cutters at all times normal to the grooves being cut.

In FIGS. 8, 9 and 10, it will be noted that the cam 16 is held in its fixed position by cam support means 64 extending downwardly from the housing 45. If desired, the cam could instead be supported from below as with the embodiment of FIGS. 5, 6, and 7. In the latter case, an opening in the support would be provided for permitting placement and removal of successive workpieces.

In each embodiment described above, it is necessary that the workpiece be fed up into the cutting means or that the cutting means be fed downwardly into the workpiece. In accordance with the teachings of the present invention, this relative movement of the cutting means and workpiece is affected during the time at which the cutter units are located in the zones of intersections 10, 11 and 12 on the rotor.

Figure 11:
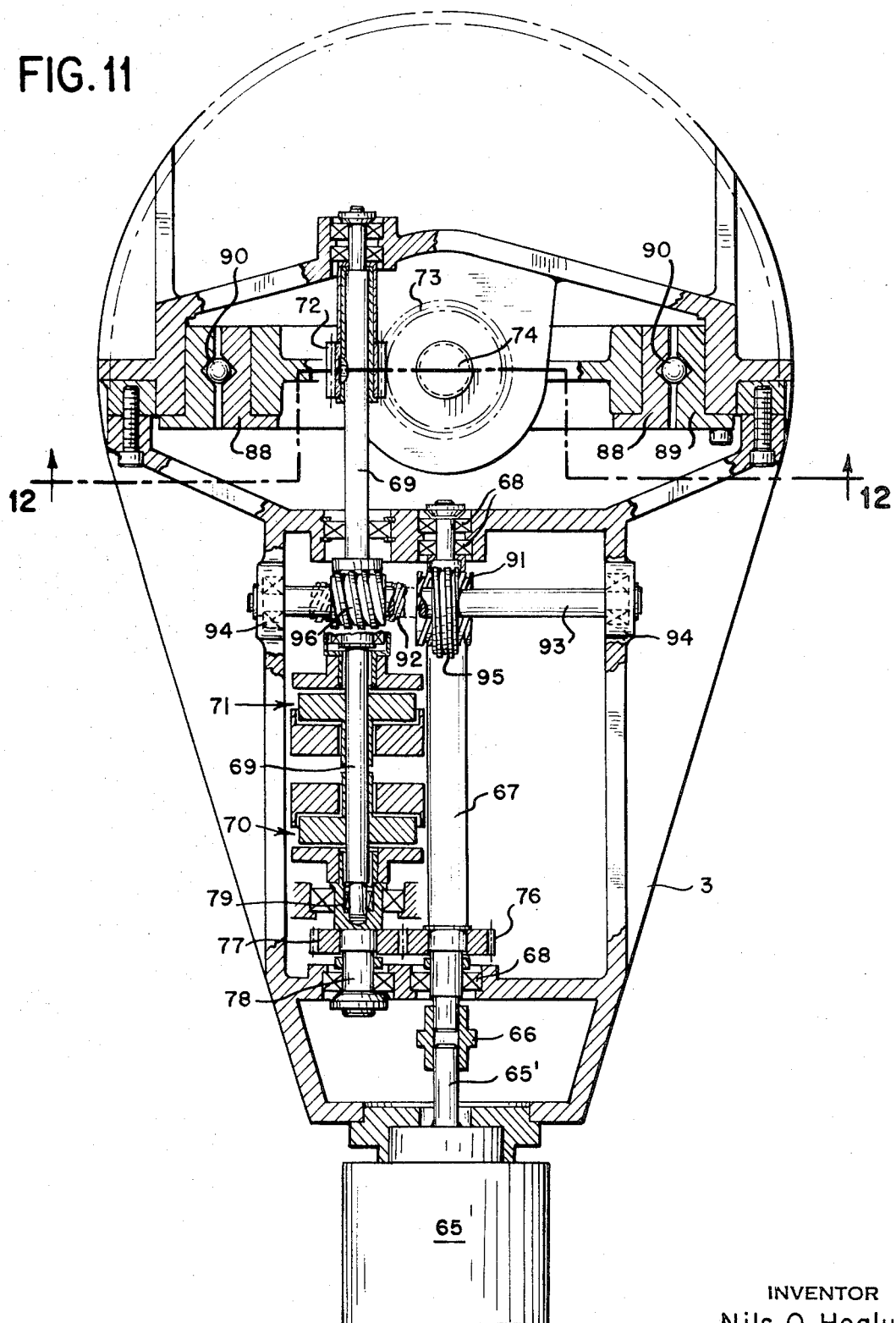
FIG. 11 is a cross-sectional view of a feeding mechanism for the cutting apparatus of FIGS. 1–10.
Figure 12:
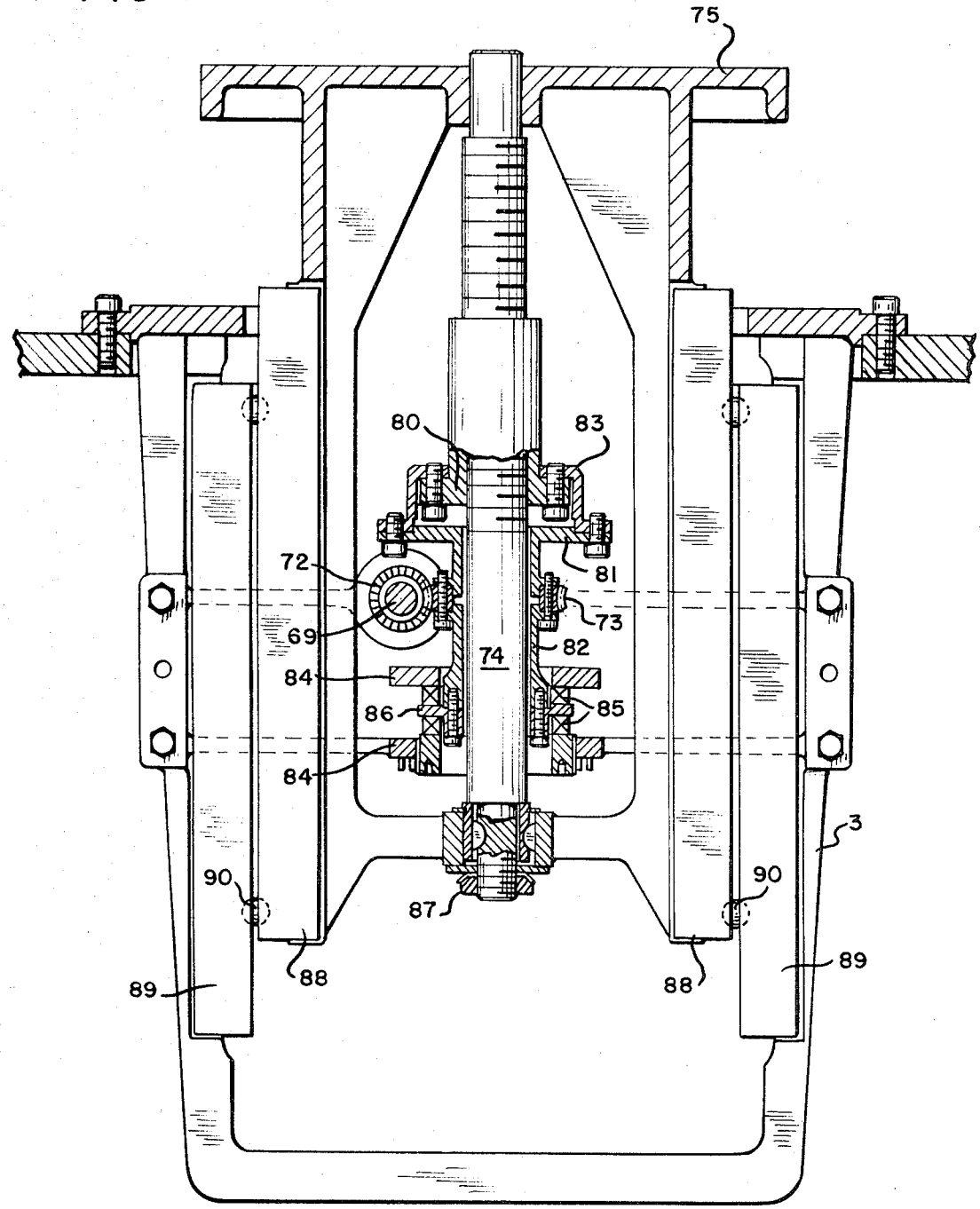
FIG. 12 is a cross-sectional view taken along lines 12—12 of FIG. 11.

FIGS. 11 and 12 show a feeding mechanism for moving the workpiece upwardly into the cutting means. In providing this feed, it is necessary that provision be made for initially feeding the workpiece toward the cutting means at a fast speed to place it properly before starting the cutting operation. This fast speed is also necessary for lowering the workpiece from the cutting means after the cutting operation has been completed. In accordance with the teachings of the present invention, the workpiece is also fed into the cutter units at a slow speed during the cutting operation. This movement is through a successive number of small increments equal to a fraction of the total depth of the cut to be made and is accomplished when the cutter units are located at the zones of intersection of the grooves.

As shown in FIG. 11, a motor 65 is mounted on the base 3 of the cutting apparatus. A coupling 66 connects the shaft 65' of the motor to a shaft 67. The shaft 67 is supported by ball bearings 68 for rotation on the base 3. Shaft 67 is selectively connected to a secondary shaft 69 through one of two clutch means 70 and 71. The shaft 69 is, in turn, provided with a worm 72 engaging a worm wheel 73 mounted on a shaft 74 to which the workpiece support means 75 is fixed.

Depending on which clutch 70 or 71 is engaged, the feed of the workpiece support 75 will be at a fast or slow speed. More particularly, the shaft 67 is connected to the shaft 69 through two drive paths. First, shaft 67 has a gear 76 which meshes with a gear 77 on a support shaft 78. Secondary shaft 69 is rotatably mounted in shaft 78 by means of a needle bearing 79. The clutch 70 is an electromagnetic clutch of conventional construction which when energized will drivingly connect the support shaft 78 to the secondary shaft 69. When this clutch is energized, the shaft 69 will rotate at the same speed as the shaft 67.

Shaft 74 is threadedly received in a nut 80 and extends rotatably through two sleeve members 81 and 82. Sleeve member 81 provides a support for the nut 80 which is held thereon by a clamp 83. Sleeve member 82, on the other hand, is rotatably mounted on the base structure 3 by means of bosses 84 and roller bearing 85. More particularly, the lower end of the sleeve member 82 includes a flange 86 rotatably mounted between the bosses 84 by way of the bearings 85. The two sleeves 81 and 82 also hold the worm wheel 73 clamped thereon. Thus, rotation of the worm wheel 73 will, in turn, effect rotation of the nut 80. The shaft 74 is fixed to the workpiece support 75 at both its upper and lower ends. To provide the connection at the lower end of the shaft, the support 75 has frame structure extending downwardly the length of the shaft with lower arm sections extending radially inwardly. A key and lock nut 87 holds these arm sections on the shaft.

When the worm wheel 73 is caused to rotate, the nut 80 will rotate and thus move the shaft 74 vertically through the nut. This will carry the workpiece support 75 up or down on the base 3. To facilitate this movement, the downwardly extending portions of the support 75 is provided with ball guides 88 operatively associated with similar guides 89 on the base 3. Suitable bearings 90 are positioned between the guides.

The feed as described above effects a fast movement of the workpiece to and from the cutting means. For effecting a slow incremental movement of the workpiece during the cutting operation, the electromagnetic clutch 71 is energized while the clutch 70 is deenergized. Clutch 71 connects the shaft 67 to the shaft 69 through a pair of worm mechanisms. As shown in FIG. 11, the shaft 67 is provided with a worm 91 while the shaft 69 is provided with a worm wheel 92. A cross shaft 93 is rotatably mounted on the base overlying the shaft 67 and 69 by way of the mounting surfaces 94. Cross shaft 93 includes a worm wheel 95 and worm 96. The worm wheel 95 cooperates with the worm 91 of the shaft 67 while the worm 96 cooperates with the worm wheel 92 of the shaft 69. When the clutch 71 is energized, the speed of rotation of the shaft 69 is reduced by the double worm reduction connecting the drive shaft 67. This, in turn, effects a very slow feeding movement of the workpiece toward the cutting means.

Figure 13:
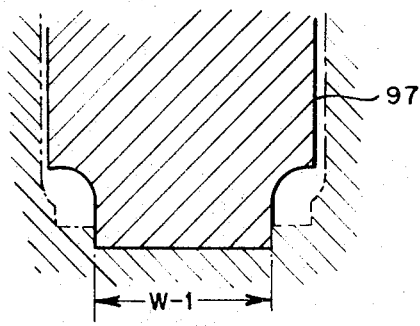
FIG. 13 is a cross-sectional view showing the shape of one type of cutter used in the cutting apparatus of the present invention.
Figure 14:
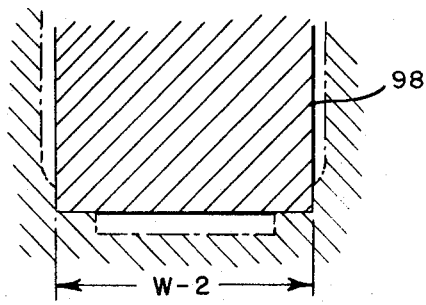
FIG. 14 is a cross-sectional view showing the shape of another type of cutter used in the cutting apparatus of the present invention.
Figure 15:
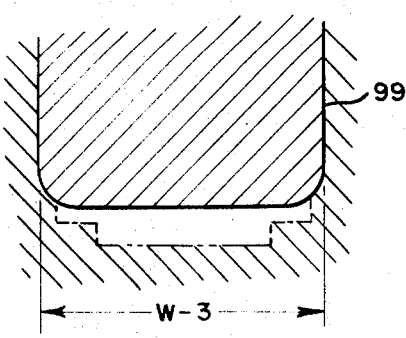
FIG. 15 is a cross-sectional view showing the shape of a third type of cutter used in the cutting apparatus of the present invention.
Figure 16:
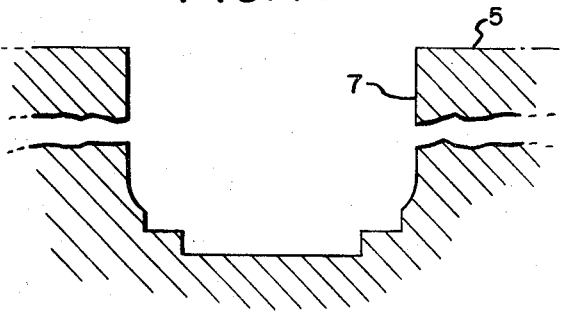
FIG. 16 is a cross-sectional view showing the shape of the grooves which are cut in the workpiece by the cutters of FIGS. 13–15.

In accordance with the teachings of the present invention, each of three cutting units 17, 18 and 19 includes a pair of single point cutters for cutting the grooves of each pair at the same time. In constructions, the shape of the cutters of each unit differs. In FIGS. 13, 14 and 15, the cutters of each unit are shown at 97, 98, 99. FIG. 16 shows the overall shape of the groove 7 being cut on the workpiece. This shape of the final groove is shown in phantom lines in FIGS. 13, 14 and 15.

The shape of the cutters and their orientation relative to the workpiece is such as to produce an efficient cutting with each cutter assisting the other cutters. In particular, the first cutter 96 has a cutting width W-1 which is less than the cutting width W-2 of the second cutter 98 and less than the cutting width W-3 of the third cutter 99. Also, the cutter 97 is enlarged above the cutting edge to provide strength. Relative to the workpiece being cut, the three cutters are disposed at different levels. More particularly, the cutter 97 is disposed at a level closer to the workpiece than the cutter 98 while the cutter 98 is disposed closer to the workpiece than the cutter 99. To effect this orientation of the three cutters they are mounted by way of cutter holders 100 on the cam followers at different heights above the workpiece.

Figure 17:
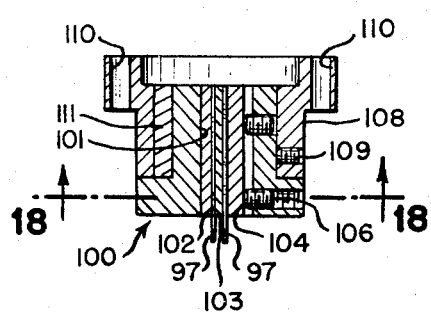
FIG. 17 is a cross-sectional view showing the mounting structure for a pair of cutters.
Figure 18:
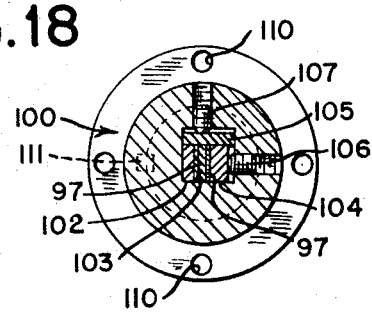
FIG. 18 is a cross-sectional view taken along lines 18—18 of FIG. 17.
Figure 19:
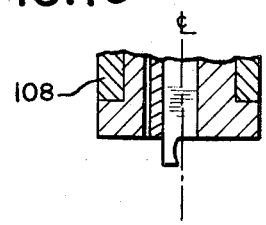
FIG. 19 is a cross-sectional view, on an enlarged scale, showing one orientation of the cutter in the mounting structure therefor.
Figure 20:
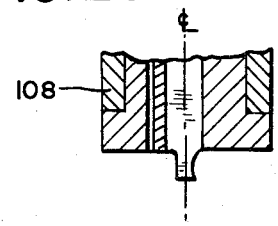
FIG. 20 is a cross-sectional view, on an enlarged scale, showing an alternative orientation of the cutter in the mounting structure therefor.

FIGS. 17 and 18 show the holder construction for supporting the cutters 97. The holder includes a bore 101 in which the cutters are disposed with the cutting edges extending downwardly out of the holder. The cutters are held in spaced relation within the bore by means of block members 102, 103, 104 and 105. Set screws 106 and 107 are threadedly supported within the holder and pressed against the blocks 104 and 105. The vertical position of the cutters within the holder can be readily set prior to tightening of the set screws. The cutter holder 100 is itself held within a retainer 108 by means of set screws one of which is shown at 109. The retainer is attached to the cam follower by bolts extending through the apertures 110. A key 111 is provided for holding the cutter holder in proper angular relationship in the retainer 108. As shown in FIG. 19, the cutter may have its cutting edge on the center line of the retainer 108. Alternatively, the cutter may be located offset from the center line of the retainer as shown in FIG. 20.

In performing a cutting operation, the cutters are moved successively along arcuate paths to cut the grooves 7, 7', 8, 8', and 9, 9'. The grooves are not cut to their final depth in one cutting stroke. Instead, the cutters are moved downwardly into the workpiece by small increments at a time. This downward incremental movement of the cutters is effected while they are disposed within the zones of intersection 10, 11 and 12 and while the cutters are turning, free of the workpiece material. Suitable means is provided for effecting this incremental feeding. With reference to FIGS. 1–12 where the apparatus is constructed for moving the workpiece upwardly into the cutters. The feeding cycle may be automatically initiated by suitable means such as a limit switch 112 shown diagrammatically in FIGS. 3, 7 and 10. This limit switch is located in the path of movement of the follower unit structure with a contact 113 adapted to cooperate with a contact 114 on one of the follower unit structures. Closing of these contacts momentarily closes an electrical circuit to intermittently actuate the electromagnetic clutch 71 each time the follower units make a complete revolution about the cam member.

In the presently preferred construction of the invention, the first cutter 97 is disposed at a level below the second cutter equal to the increment through which all the cutters are moved when in the zones of intersection between the grooves being cut. Similarly, the second cutter is located at a level below the third cutter which is equal to this same increment of movement. With this construction, the cutting operation of the grooves will be performed by first moving the workpiece upwardly toward the cutting units at a fast speed. From this starting position, the workpiece will then be moved at a slower speed through one increment while the cutter units are disposed in alignment with the three zones of intersection between the grooves to be cut. This feedling will move the first cutters 97 of the first cutting unit down below the upper surface of the workpiece while the cutters 98 and 99 of the second and third units will remain spaced above the workpiece. The cutters will then be moved through one complete revolution so that the cutters 97 make an initial cut along the grooves 7, 7', 8, 8', and 9, 9'. After this and when the cutters are again aligned with the zones of intersection, the workpiece will be moved at a slow speed through another increment and move the second cutters 98 below the upper surface of the workpiece. All cutters will then be revolved through one more complete revolution during which time the cutters 97 will be making a second cut and the second cutters will be making their first cut. Following this, the workpiece will be moved through still another increment to move the third cutters 99 below the upper surface of the workpiece. Upon rotation of the cutters through one more revolution, all three units will be performing a cutting operation. Each time the cutters revolve a complete revolution and align themselves within the zones of intersection of the cutting paths, the workpiece will be moved an additional increment into the cutters. This cutting procedure will continue until each groove is cut to its final depth.

With the preferred cutting arrangement of the present invention, the first cutter will perform a rough cutting, the second cutter will perform a semi-finishing operation and the third cutter will finish the groove to the desired surface finish. In accordance with the teachings of the present invention, the cutters assist each other in performing the cutting operation. More particularly, once all of the cutters are performing a cutting operation, the cut performed by the third cutters 99 will provide clearance for chips removed from the workpiece by the second cutters 98; and similarly, the second cutters 98 will provide clearance for the chips being removed by the first cutters 97.

Instead of using three different types of cutters as described above, however, the three pairs of cutters may all be used to finish the grooves. In this case, the feeding of the workpiece relative to the cutters will be effected each time the cutting units reach the next zone of intersection. Thus, for each complete revolution of the cutters about the workpiece, the cutters will be fed into the workpiece three times. For automatic control of this feeding, a limit switch 112 is located at each apex of the cam for engagement by the contact 114 on the follower unit 17.

When cutting the seal grooves in the rotor for a Wankel engine, the overall width of the groove may, for example, be approximately 0.040 inch. The first cutter which performs the rough cutting will have a cutting width of approximately 0.025 inch and an upper enlarged section of about 0.036 inch. This will leave a clearance of about 0.002 on either side of these cutters 97 and the walls of the groove being cut. The second cutter may have a uniform cross-sectional width of approximately 0.032 inch to leave a clearance of 0.004 inch at either side of the groove. Finally, the third cutter will have a width equal to the final width of the groove. With incremental movements of the workpiece toward the cutters of 0.003 inch it will take approximately 60 revolutions to cut a groove having a total depth of 0.170 inch. In any case where the total depth is not an exact multiple of the incremental movement of the cutters into the workpiece, this may be compensated for by the initial location to which the workpiece is moved at the starting of the cutting operation. Also, the final incremental feeding can be adjusted.

After the cutting operation has been completed on both sides of the rotor, it is ready to receive the seal strips without further processing. The grooves will be accurately formed to properly receive these strips and the counter-sunk bottom of the groove will provide space for spring means on which the seal strips are to be supported.

Figure 21:
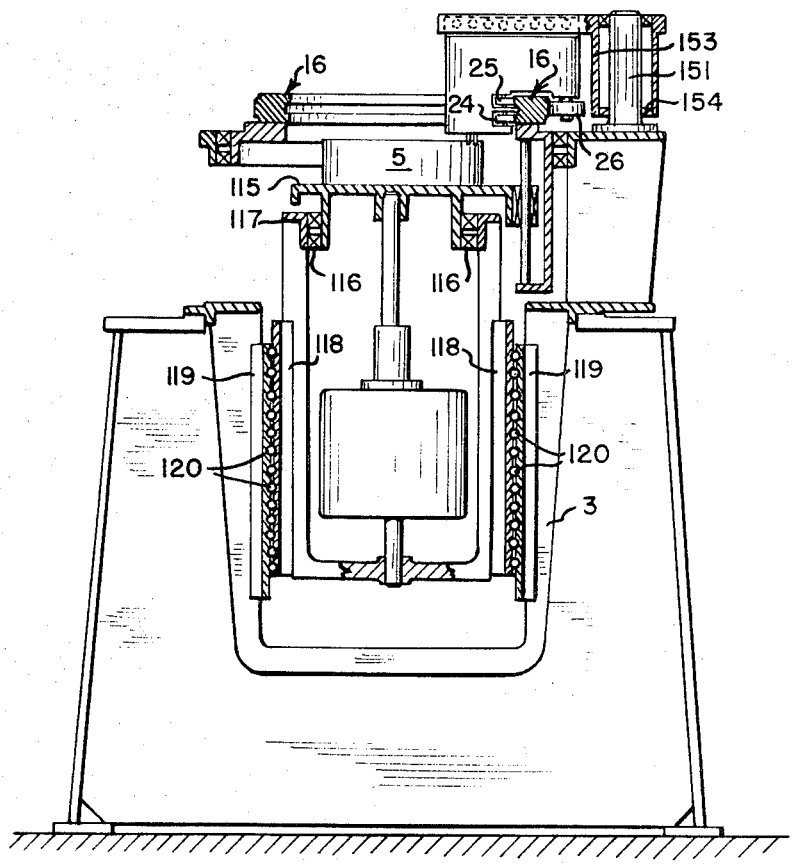
FIG. 21 is a side elevation of another embodiment of the cutting apparatus of the present invention.
Figure 23:
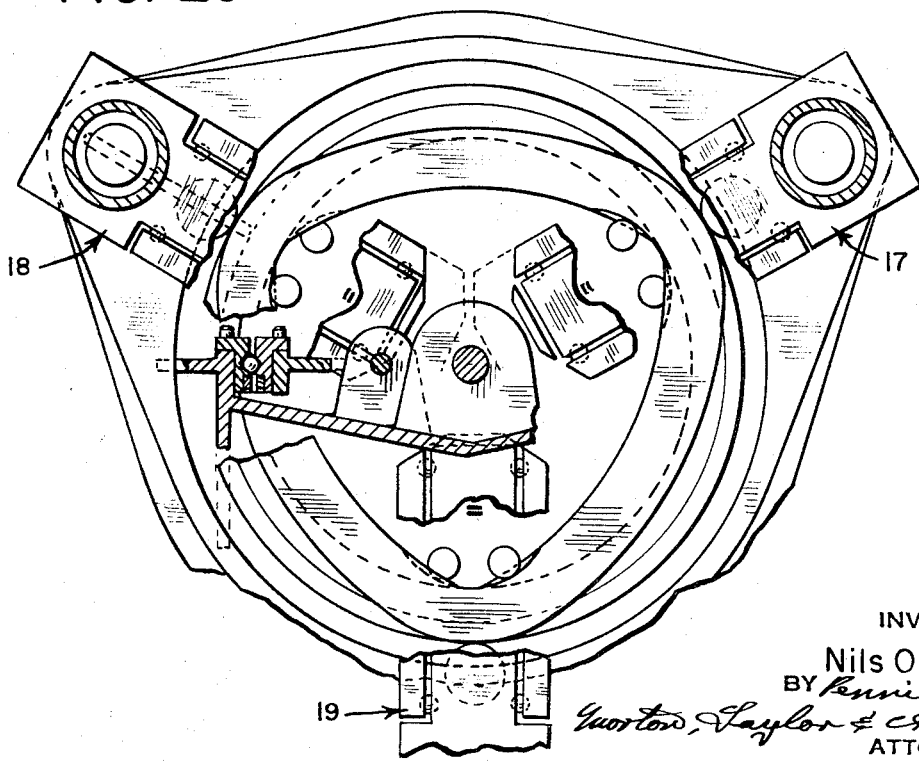
FIG. 23 is a plan view of the cutting apparatus shown in FIG. 22.

FIGS. 21, 22 and 23 shows an alternative embodiment of the present invention in which the cutter units are supported on stationary posts and both the cam and workpiece are rotated to effect movement of the cam followers with respect to the cam and the cutter units with respect to the workpiece. For clarity, only one follower unit and cutting unit is shown in FIGS. 21 and 22. As shown in FIG. 23, however, three units spaced at 120° are provided.

Referring to FIGS. 21 and 22, the workpiece 5 is mounted on a platform 115 which is, in turn, rotatably supported by bearings 116 on a slide member 117. The slide member 117 includes ball guides 118 disposed opposite ball guides 119 fixed to the base structure 3 of the apparatus. Suitable balls 120 are disposed between the two ball guides to permit sliding movement of the slide member 117 relative to the base in a vertical direction.

A hydraulic motor 121 is mounted on the slide member 117 and has its output shaft 122 connected to an adaptor member 123 and coupling 124. The coupling supports a sprocket gear 125. The sprocket gear 125, through a sprocket chain 126, rotates a sprocket gear 127, in turn, fixed to a support shaft 128 by way of a spline member 128. The drive connection between the motor 121 and the shaft 128, as provided by the sprocket and chain connection, effects continuous rotation of the shaft. The upper end of the shaft 128 is connected via a clutch 129 to the support platform 115. With the clutch 129 energized, continuous rotation of the shaft 128 effects continuous rotation of the support platform and the workpiece 5 relative to the overlying cutting units.

In this embodiment of the invention, it is necessary that the cam 16 be rotated in unison with the workpiece. For this purpose, the cam is rotatably supported on the base structure 3 of the machine via the bearings 130 and support structure 131. Vertically extending posts 132 couple the cam support structure to the workpiece support platform 115. Accordingly, rotation of the platform will, through the connection provided by the posts 132 produce simultaneous rotation of the cam relative to the cam follower units.

With the embodiment of the invention shown in FIGS. 21, 22 and 23, separate drive connections are provided for feeding the workpiece toward the cutter units, one for fast feeding of the workpiece prior to and after the cutting cycle and one for slow feeding the workpiece in small increments during the cutting cycle. As shown in FIG. 22, the output shaft 122 is connected to one side of an electromagnetic clutch 133 by way of the adaptor member 123 and coupling 124. The adaptor member rotatably supports a shaft 134 by way of a needle bearing 135. The other side of the electromagnetic clutch 133 is mounted on the shaft 134 so as to permit selective coupling of the drive motor 121 to the shaft 134. The coupling and adaptor member are themselves rotatably supported on the slide member 117 by way of bearings 135.

The upper end of the shaft 134 is provided with a gear 136 meshing with a gear 137 fixed to a nut member 138. The nut member is rotatably mounted on the base structure 3 and held against vertical movement relative to the slide 117 by means of a clamping structure 139 and bearing means 140. The support shaft 128 extends in threaded engagement through the nut member and is adapted to be moved vertically in an up and down direction in response to rotation of the nut member. As seen in FIG. 22, the threaded support shaft is rotatably supported at its lower end in the slide member 117 by means of a bearing 141.

For effecting the incremental movement of the platform and workpiece during the cutting operation, a secondary drive is provided. This drive moves the shaft 128 vertically at a slow speed. As shown in FIG. 22, the rotating spline 128 is provided with a gear 144 meshing with a gear 145, in turn, fixed to an adaptor 147. The adaptor rotatably mounts a shaft 148 parallel to shaft 128. The adaptor is connected to one side of an electromagnetic clutch 149 while the other side of the clutch is connected to the shaft 148. The upper end of the shaft is provided with a gear 150 meshing with the gear 137 fixed to the nut member 138.

In operation, the motor 121 is continuously rotating the shaft 128 to effect a corresponding rotation of the workpiece and cam. Normally, the clutches 133 and 149 will be deenergized and the nut member 138 will rotate with the shaft 128 due to the bearing support 140. When it is desired to move the workpiece to and from the cutting positions, the clutch will be energized. This will effect rotation of the nut in a direction opposite the rotation of the shaft 128 thereby producing a rapid feed of the workpiece relative to the cutting units. When on the other hand the clutch 149 is energized, the rotation of the nut and support shaft 128 will be in the same direction but at slightly different speeds. This will produce a slow incremental feed of the workpiece relative to the cutting units. Reverse driving of the motor 121 and similar energization of the clutches will effect a retraction of the workpiece away from the cutting units. During this movement and also during the fast feeding of the workpiece to the initial starting position, the clutch 129 connecting the shaft 128 to the support platform 115 is advantageously deenergized. This permits the fast feeding of the workpiece to be effected without at the same time rotating the workpiece.

With the above construction where the workpiece and cam are rotated relative to the cutting units, stationary support posts 151 are provided for supporting each of the follower units. The support posts are fixed to the support base 3 at intervals spaced 120° about the axis of rotation of the support shaft 128. Each of the follower units is mounted on a slide support 152 for sliding linear movement toward and away from the shaft 128. The slide support 152 is, in turn, mounted on a housing 153 which is rotatably supported on the support post 151 by means of bearing 154. The follower unit includes a slide housing 155 slidably mounted on the slide support 152 and constructed for supporting the follower rollers 24, 25 and 26. A slide 156 slidably supports the roller 26 within the housing 155. The roller 26 is biased against the outer tracking surface 23 of the cam 16 by means of bevel washers 156 and an adjusting nut 158. The manner in which the cam followers cooperate with the cam as the two are moved relative to each other is the same as in the embodiments where the followers are moved and the cam held stationary.

Figure 24:
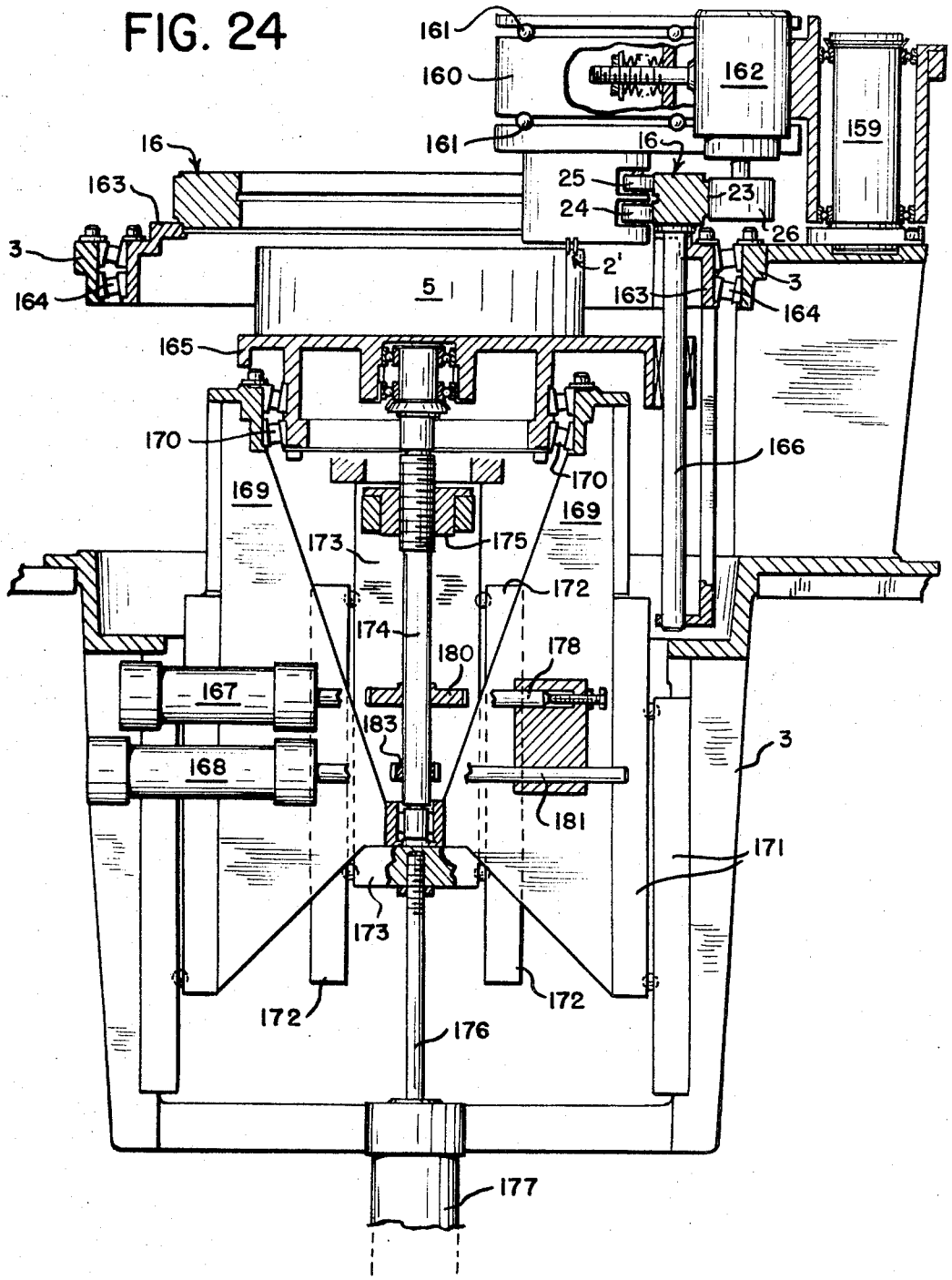
FIG. 24 is a cross-sectional view of still another embodiment of the cutting apparatus of the present invention.

In the embodiment of the invention shown in FIGS. 21-23, the workpiece and the cam are driven relative to the cam followers and cutting units by a drive coupled to that used for feeding the workpiece in a vertical direction. As an alternative to this construction, the drive for rotating the workpiece and cam may act directly through the cam. Such a construction is shown in FIGS. 24, 25 and 26. Here, each of the follower units is again rotatably mounted on a stationary support post 159. Also, linear sliding movement in a direction toward the shaft is provided by the bearing support of follower housing 160 on the slide structure 161. The roller 26 of each follower unit, instead of being freely rotatable as in the embodiment of the invention shown in FIG. 22, is secured to the output shaft of a drive motor 162. Driving of the roller 26 against the outer tracking surface 23 of the cam 16 will effect movement of the cam between the roller 26 and the rollers 24 and 25. To permit this movement, the cam is mounted on a support 163 which is, itself, rotatably mounted on the base structure 3 via bearings 164. The support for the cam 16 is coupled to the support 165 for the workpiece 5 via posts 166. Thus, driving of the cam by the rollers 26 will also effect rotation of the support 165 and workpiece.

With the construction shown in FIG. 24, the feeding of the workpiece in a vertical direction is through a pair of hydraulic actuators 167 and 168. More particularly, the support platform 165 is rotatably mounted on a slide 169 by way of bearing 170. The slide 169 is, in turn, slidably mounted on the base structure 3 via the slide guide members 171. The slide 169 also contains ball slide guides 172 for slidably mounting a second slide member 173 thereon. A threaded support shaft 174 is rotatably mounted on the slide 173 and its upper end rotatably supports the platform 165. The shaft 174 is threadedly engaged in a nut member 175, fixed to the slide 173. The lower end of the slide 173 is connected to the piston rod 176 of a hydraulic cylinder 177. Actuation of the hydraulic cylinder to move the rod 176 in a vertical direction effects vertical movement of the slides 169 and 173. The hydraulic-actuator is used for fast feeding the platform 165 and the workpiece thereon to and from the cutting means.

Once the workpiece has been moved into the starting position for the cutting operation, incremental movement of the workpiece is required. To accomplish this, the shaft 174 is rotated. As shown in FIGS. 25 and 26 (on the sheet containing FIG. 3), the hydraulic actuator 167 is provided with a piston rod 178 having a pawl 179. The pawl cooperates with a ratchet wheel 180 fixed to the shaft 174. Each time the workpiece is to be moved through an increment in the upward direction the hydraulic actuator 167 is activated to cause the pawl to turn the wheel 180 through the required distance. The hydraulic actuator may be activated in timed sequences relative to the positioning of the cutter units by suitable means such as the limit switch construction used in the embodiments of the invention previously described.

After the workpiece has been moved through successive increments and the grooves in the workpiece have been cut to their final depth, the pawl 179 is disengaged from the ratchet wheel 180 by extending the piston rod 178. The hydraulic actuator 168 is then activated. The piston rod 181 of this actuator includes a rack 182 engaging a gear 183 fixed to the shaft 174. Activation of the actuator 168 to extend the piston rod 181 returns the shaft 174 to its original angular position and the platform 165 to its starting position. The hydraulic actuator 177 is then activated to retract the piston rod 176. This, in turn, lowers the platform 165 leaving the necessary clearance for unloading the workpiece and loading a new workpiece.

In describing the present invention a number of different embodiments have been set forth. It is to be noted, however, that various modifications of these embodiments can be made without departing from the scope of the invention. For example, the cutter units and the cam-cam follower mechanism could be mounted for vertical movement downward toward the workpiece. Also, the automatic feeding of the workpiece relative to the cutters during the cutting operation could be accomplished by electronic circuitry or by hand. Similarly, other types of mechanisms may be used for effecting fast and slow feeding of the workpiece and cutters into cutting relation.

I claim:

1. A cutting apparatus for cutting a surface of a workpiece along at least two predetermined paths intersecting each other at an acute angle in a small zone comprising:
   a. support means for supporting said workpiece;
   b. a cam member;
   c. a follower movable relatively along said cam;
   d. cutting means mounted on said follower for movement therewith;
   e. driving means for moving said follower relatively along said cam member, said cam member and follower having cooperating means for effecting movement of the cutting means along said predetermined paths as said follower moves relatively along said cam member; and
   f. control means for turning said follower on said cam member to move said cutting means from the end of one of said paths to the beginning of the other while holding said cutting means in the zone of intersection of said two paths.

2. A cutting apparatus according to claim 1 wherein:
   a. said two predetermined paths are arcuate paths with the concave sides thereof facing eath other;
   b. said cam member has a first arcuately shaped means directly related to said first path and a second arcuately shaped means directly related to said second path;
   c. said follower includes a bearing means engaging said first and second arcuately shaped means as said follower moves relatively along said cam member;
   d. said cutter means is mounted on said follower facing the concave side of said arcuately shaped means as the follower moves along the cam member; and
   e. said first and second arcuately shaped means and said bearing means define said cooperating means for effecting movement of said cutting means along said predetermined paths.

3. A cutting apparatus according to claim 2 wherein:
   a. said first arcuate path and said first arcuately shaped means describe portions of circles with a common center of curvature;
   b. said second arcuate path and said second arcuately shaped means describe portions of circles with a common center of curvature; and
   c. said control means for turning the follower on the cam member includes third arcuately shaped means connecting said first and second arcuately shaped means together and having instantaneous centers of curvature within said zone of intersection of the two paths being cut on said workpiece.

4. A cutting apparatus for cutting a surface of a workpiece along first, second and third predetermined paths intersecting each other at their ends in small zones comprising:
   a. support means for supporting said workpiece;
   b. a cam member having an annular shape disposed in surrounding relation to said workpiece;
   c. follower means mounted for relative movement along said cam;
   d. cutting means mounted on said follower means for movement therewith;
   e. driving means for moving said follower means relatively along said cam member, said cam member and follower means having cooperating means for effecting movement of the cutting means along said predetermined paths as said follower means moves relatively along said cam member; and
   f. control means for turning said follower means on said cam member to move said cutting means from the end of each one of said paths to the beginning of the next adjacent path while holding said cutting means in the zone of intersection of these two paths.

5. A cutting apparatus according to claim 4 wherein:
   a. said cam member includes:
      1. inner and outer elongated tracking surfaces,
      2. said tracking surfaces including first, second and third sections directly related to the first, second and third paths to be cut on the workpiece, and
      3. said tracking surfaces further including turning sections connecting the first, second and third sections and defining said control means;
   b. said follower means includes bearing means for engaging the inner and outer tracking surfaces for movement along the lengths thereof; and
   c. the first, second, and third sections of the tracking surfaces and the bearing means define the cooperating means effecting movement of said cutting means along said predetermined paths.

6. A cutting apparatus according to claim 5 wherein:
   a. said driving means includes means for continuously moving said follower means in one direction relatively along said cam member to move said cutting means successively through said first, second and third predetermined paths.

7. A cutting apparatus according to claim 4 wherein:
   a. said cam member includes:
      1. first and second inner elongated tracking surfaces disposed at different levels relative to the lengths thereof, and
      2. an outer elongated tracking surface;
      3. said tracking surfaces each having first, second and third sections directly related to the first, second and third paths to be cut on said workpiece, and
      4. said tracking surfaces further having turning sections connecting the first, second and third sections and defining said control means;
   b. said follower means includes:
      1. first and second bearing means engaging the first and second inner tracking surfaces, respectively, for movement along the lengths thereof, and
      2. a third bearing means engaging the outer tracking surface,
      3. said first and second bearing means being spaced equally from each other on opposite sides of a plane extending therebetween and through the third bearing means; and
   c. the first, second and third sections of the tracking surfaces and the bearing means define the cooperating means effecting movement of said cutting means along said predetermined paths.

8. A cutting apparatus according to claim 7 wherein:
a. said follower means comprises first, second and third follower units, each having said first, second and third bearing means, said units being spaced about a predetermined point at 120° with respect to each other for simultaneously engaging the first, second and third sections of the tracking surfaces.

9. A cutting apparatus according to claim 8 wherein:
a. each of said bearing means comprises a rotatable roller for rolling against said tracking surfaces.

10. A cutting apparatus according to claim 9 further including:
a. follower support means for said follower units mounted for rotation about said predetermined point; and
b. means for mounting each of said follower units on said follower support means for both rotation about and linear sliding movement toward and away from said predetermined point.

11. A cutting apparatus according to claim 10 wherein:
a. said driving means includes power means for rotating each of said third rollers to effect movement of said follower units along the cam member.

12. A cutting apparatus according to claim 10 wherein:
a. said follower support means includes:
 1. a support post having its longitudinal axis extending through said point,
 2. a housing rotatably supported on said post for rotation about said longitudinal axis,
 3. three radially directed extensions fixed to said housing,
 4. slide means mounted on each of said extensions for sliding linear movement toward and away from the axis of rotation of said housing, and
 5. means for rotatably mounting a follower unit on each of said slide means for rotation about an axis extending parallel to the axis of rotation of said housing; and
b. said driving means includes a drive motor mounted on each of said follower unit and having an output shaft on which the third roller of the follower unit is mounted.

13. A cutting apparatus according to claim 10 wherein:
a. said driving means includes power means directly connected to said follower support means for rotating same about said point.

14. A cutting apparatus according to claim 10 wherein:
a. said follower support means includes:
 1. a support post having its longitudinal axis extending through said point,
 2. a housing for rotatably supporting said post,
 3. three radially directed extensions fixed to said post,
 4. a slide support rotatably mounted on each of said extensions for rotation about an axis extending parallel to the axis of rotation of said support post, and
 5. slide means for mounting a follower unit on each of said side supports for sliding linear movement toward and away from the point about which the support post rotates; and b. said driving means includes a drive motor supported on said housing for power rotating said post.

15. A cutting apparatus according to claim 10 wherein:
a. said driving means includes power means for rotating the support for said workpiece and said cam member simultaneously about said predetermined point.

16. A cutting apparatus according to claim 10 further including:
a. feeding means for moving said workpiece into said cutting means along a direction extending at right angles to the movement of the cutting means along said predetermined paths.

17. A cutting apparatus according to claim 16 wherein:
a. said feeding means includes control means for effecting incremental movement of the workpiece when the cutting means are aligned within said zones on intersection.

18. A cutting apparatus according to claim 10 wherein:
a. said cutting means includes a cutting unit mounted on each of said follower units in overlying relation with the workpiece, each of said cutting units being mounted at a different level relative to the workpiece;
b. feeding means for moving said workpiece toward said cutting units along a direction extending at right angles to the movement of the cutting units along said predetermined paths;
c. feeding means for effecting incremental feeding movement of the workpiece toward the cutting units when the cutting units are aligned with the zones of intersection of said predetermined paths.

19. A cutting apparatus according to claim 18 wherein:
a. the cutting unit mounted at a level closest to the workpiece includes cutter means having a cutting width less than that of the cutters on the other two units;
b. the cutting unit mounted at a level farthest from the workpiece includes cutter means having a width greater than that of the cutter means on the other two cutting units.

20. A cutting apparatus according to claim 19 wherein:
a. the cutter units are spaced from each other at different levels relative to the workpiece with the difference between each level being at least equal to the length of incremental movement of the workpiece.

21. A cutting apparatus according to claim 19 wherein:
a. the support means for supporting the workpiece includes:
 1. a platform underlying the workpiece, and
 2. a threaded shaft connected to the platform and extending downwardly therefrom; and
b. the feeding means includes:
 1. slide means mounting the support shaft for movement in the direction of its axis,
 2. a first power actuator for moving the slide means through a predetermined distance to move the workpiece to and from a starting position relative to the cutting units, 3. a nut member threadedly engaging said threaded shaft and fixed to the slide means against rotation,
4. a second power actuator mounted on the slide means and having a pawl connected thereto,
5. a first gear fixed to the threaded shaft and operatively engaged by said pawl to effect incremental rotation of the shaft in one direction and raising of said platform upon incremental linear movement of the pawl,
6. a third power actuator mounted on the slide means and having a rack member fixed thereto, and
7. a second gear fixed to the threaded shaft and operatively associated with the rack for rotating the shaft continuously in a direction opposite to the rotation effected by the activation of the second power actuator to lower the platform to its starting position.

22. A cutting apparatus for cutting a workpiece to a predetermined depth along three paths which intersect each other at their ends comprising:
 a. first, second and third cutters mounted for sequential movement through said three paths with the first cutter leading the second and the second leading the third;
 b. said first cutter having a cutting width less than that of the other two cutters and being disposed relative to the other cutters at a level closer to the workpiece;
 c. said second cutter having a cutting width less than that of the third cutter and being disposed relative to the third cutter at a level closer to the workpiece; and
 d. feeding means for moving said cutters into said workpiece in increments until the third cutter reaches said predetermined depth.

23. A cutting apparatus according to claim 22 wherein:
 a. the paths along the workpiece through which the cutters move intersect each other in zones void of workpiece material; and
 b. said feeding means moves said cutters into said workpiece through said increments when the cutters are in said zones.

24. A cutting apparatus according to claim 23 further including:
 a. rotatable support means for supporting said cutter units at equally spaced intervals about the axis of rotation of the support means;
 b. drive means for rotating said support means about said axes; and
 c. turning means for turning said cutter units when in said zones of intersection to move them from alignment with the end of one path and into alignment with the beginning of the next path.

25. A cutting apparatus according to claim 24 wherein:
 a. the three cutters are spaced from each other at different levels relative to said workpiece with the distance between each level being at least equal to the length of the incremental movement of the cutters.

* * * * *

UNITED STATES PATENT OFFICE
CERTIFICATE OF CORRECTION

Patent No. 3,752,057      Dated August 14, 1973

Inventor(s) Frederick H. Groen, Jr.

It is certified that error appears in the above-identified patent and that said Letters Patent are hereby corrected as shown below:

Column 5, line 29, "same" should read --said--.
Column 6, line 13, "means" should start a new paragraph.

Signed and sealed this 27th day of November 1973.

(SEAL)
Attest:

EDWARD M. FLETCHER, JR.            RENE D. TEGTMEYER
Attesting Officer                  Acting Commissioner of Patents